(12) United States Patent
Kang et al.

(10) Patent No.: US 8,924,321 B2
(45) Date of Patent: Dec. 30, 2014

(54) THREE-LAYERED NEURON DEVICES FOR NEURAL NETWORK WITH RESET VOLTAGE PULSE

(75) Inventors: Jinfeng Kang, Beijing (CN); Bin Gao, Beijing (CN); Feifei Zhang, Beijing (CN); Bing Chen, Beijing (CN); Lifeng Liu, Beijing (CN); Xiaoyan Liu, Beijing (CN)

(73) Assignee: Peking University, Beijing (CN)

( * ) Notice: Subject to any disclaimer, the term of this patent is extended or adjusted under 35 U.S.C. 154(b) by 300 days.

(21) Appl. No.: 13/502,462

(22) PCT Filed: Nov. 3, 2011

(86) PCT No.: PCT/CN2011/081733
§ 371 (c)(1),
(2), (4) Date: Jul. 25, 2012

(87) PCT Pub. No.: WO2012/051968
PCT Pub. Date: Apr. 26, 2012

(65) Prior Publication Data
US 2012/0284218 A1      Nov. 8, 2012

(30) Foreign Application Priority Data
Oct. 20, 2010   (CN) .......................... 2010 1 0519997

(51) Int. Cl.
*G06F 15/18*   (2006.01)
*G06N 3/00*    (2006.01)
*G06N 3/063*   (2006.01)

(52) U.S. Cl.
CPC ..................................... *G06N 3/063* (2013.01)
USPC ........................................................ 706/28

(58) Field of Classification Search
None
See application file for complete search history.

(56) References Cited

U.S. PATENT DOCUMENTS

| 5,296,835 | A | | 3/1994 | Nakamura |
| 5,422,982 | A | | 6/1995 | Pernisz |
| 5,621,336 | A | * | 4/1997 | Shibata et al. .................. 326/36 |
| 6,956,280 | B2 | * | 10/2005 | Tajiri et al. .................... 257/537 |
| 7,957,793 | B2 | * | 6/2011 | Montgomery et al. ........ 600/544 |

FOREIGN PATENT DOCUMENTS

CN           1447457 A       10/2003

OTHER PUBLICATIONS

PCT International Preliminary Report on Patentability dated Jan. 4, 2013, from related International Application No. PCT/CN2011/081733 (4 pages) (Note: The references cited in this Report have been previously submitted to the USPTO in the IDS filed on Apr. 17, 2012, and have not been resubmitted herein.).
International Search Report from PCT/CN2011/081733 dated Feb. 16, 2012 (4 pages).
Written Opinion from PCT/CN2011/081733 dated Feb. 16, 2012 (4 pages).
Abstract of CN1447457A (1 page).

* cited by examiner

*Primary Examiner* — Li-Wu Chang
(74) *Attorney, Agent, or Firm* — Osha Liang LLP

(57) ABSTRACT

A neuron device includes a bottom electrode, a top electrode, and a layer of metal oxide variable resistance material sandwiched between the bottom electrode and the top electrode, in which the neuron device is switched to a normal state upon application of reset pulse, and is switched to an excitation state upon application of stimulus pulses. The neuron device has a comprehensive response to different amplitude, different width of a stimulus voltage pulse and different number of a sequence of stimulus pulses, and provides functionalities of a weighting section and a computing section. The neuron device has a simple structure, excellent scalability, quick speed, low operation voltage, and is compatible with the conventional silicon-based CMOS fabrication process, and thus suitable for mass production. The neuron device is capable of performing many biological functions and complex logic operations.

14 Claims, 3 Drawing Sheets

THREE-LAYERED NEURON DEVICES FOR NEURAL NETWORK WITH RESET VOLTAGE PULSE

CROSS-REFERENCE TO RELATED APPLICATIONS

This is a national stage application based on PCT/CN2011/081733, filed on Nov. 3, 2011, which claims priority to China Patent Application No. CN 201010519997.3, filed on Oct. 20, 2010. This application claims the priority of these prior applications and incorporates their disclosures by reference in their entireties.

TECHNICAL FIELD

The present invention relates to electronic devices, and particularly relates to electronic devices that can achieve neuron functionality and a neural network formed by the electronic devices.

BACKGROUND

A conventional computer generally implements information processing and storage functionalities in binary logic. The processing (or computing) and storage of information are carried out separately in different devices or functional modules. The computing process is usually a serial process having steps executed one by one.

It is possible to improve efficiency by emulating a neural network of a brain when implementing information computation and storage functions. This has become an importance trend for information science development in the future. Such processing functionality like neural network should be based on the devices and circuits like neuron, including memorizing, switching, adaptive learning, advanced computing, etc.

A conventional neural network integrated circuit includes an array of a plurality of neurons, and each of the neurons includes at least one input line (corresponding to at least one synapse and dendrite), one operational amplifier (corresponding to one neurocyte), and one output line (corresponding to one neuraxon). Signals are inputted via the at least one input line and weighted, summed in the operational amplifier, and outputted via the output line if the sum of the signals exceeds a preset value. The input line includes a fixed or variable resistor as the weighting section. As an example, U.S. Pat. No. 5,422,982 discloses a neural network in which a variable resistor formed by $SiO_2$ film acts as synapse of a neuron, and U.S. Pat. No. 5,296,835 discloses a neural network in which a variable resistor formed by sulfide is used as a weighting section.

For the variable-resistor-based neuron disclosed in the above two documents, a resistance value is adjusted by changing an externally-applied voltage, thereby enabling the adaptive learning functionality of the neuron. However, it is difficult to implement the logic operation functionality of the neuron. In the existing neutral networks, the fixed or variable resistor is only a part of the neuron, and plays only the role of weighting section. Each neuron further requires an independent operational amplifier for summing the weighted signals. The independent operational amplifier needs to be composed of intricate circuitries.

The existing neural network has the problem of low speed, high power consumption and low integration level, due to the requirement for an independent variable resistor (as weighting section) and an independent operational amplifier.

It is thus desirable for a neural network with higher speed, lower operating voltage and current, and excellent scalability. There is a need for a neuron device capable of simplifying device structure, increasing the integration level and reducing production cost, which is still a challenge in the research topic.

SUMMARY OF THE INVENTION

The object of the present invention is to provide a neuron device and a neural network having a simple structure.

In one aspect of the present invention, a neuron device is provided comprising a bottom electrode, a top electrode, and a layer of metal oxide variable resistance material sandwiched between the bottom electrode and the top electrode, wherein the neuron device is switched to a normal state upon application of reset pulse, and switched to an excitation state upon application of stimulus pulses.

The neuron device has a comprehensive response to different pulse amplitudes, pulse widths of a stimulus voltage pulse, and different numbers of a sequence of stimulus voltage pulses, and provides functionalities of a weighting section and a computing section.

In another aspect of the present invention, a neural network is provided comprising a plurality of the above neuron devices, wherein the plurality of neuron devices are electrically connected to each other.

The present invention utilizes metal oxide material with variable resistance to implement biological functions of a neuron, which is the basis for advanced recognition and computation.

On one hand, the neuron device is switched from one resistive state to another resistive state in response to different amplitude and width of the externally-applied voltage pulse, and thus enables the function of weighting stimulus signals.

On the other hand, the neuron device has different resistance values in response to the number of the sequential pulses applied on the device, and thus enables to process basic functions, such as addition, division, etc.

The present invention has the advantage of utilizing only one device to process all functions of a neuron, without the need for separated weighting section and computing section.

The neuron device has a simple structure, is easy to be integrated, compatible with the conventional silicon-based CMOS fabrication process, and thus suitable for mass production. Meanwhile, the variable resistance material used in the neuron device has a high speed (e.g., in the order of ns) and a low operating voltage (e.g., a few volts). These advantages make the neuron device a promising candidate for the future high-performance device. The neuron device responds to different external stimuli, and has the functions of transmission, switching, cognitive learning, memorization, etc., thereby enabling many biological functions and complex logical operations.

BRIEF DESCRIPTION OF THE DRAWINGS

The above features and advantages of the present invention will be more apparent from the following detailed description in conjunction with figures, in which.

DETAILED DESCRIPTION

Figure 1:
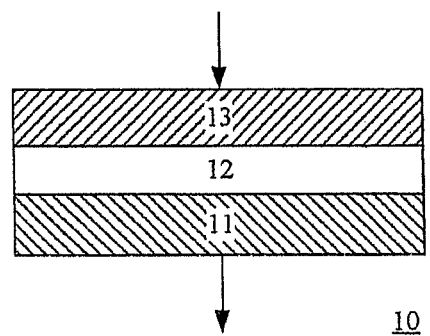
FIG. 1 is a schematic diagram illustrating a structure of the neuron device according to the present invention.

It has been found that some metal oxide materials exhibit variable resistance, which are referred to as "variable resistance material" hereinafter. The variable resistance material is generally metal oxide including one selected from a group consisting of $HfO_2$, NiO, $TiO_2$, $ZrO_2$, ZnO, $WO_3$, $Ta_2O_5$, $Al_2O_3$, $MoO_x$, $CeO_x$, $La_2O_3$ and any combination thereof. The variable resistance material can have multilevel stable resistive states.

The resistive switching of metal oxides is caused by connection and rupture of filamentous conductive channels inside the metal oxide layers. The conductive filaments are formed by arrangement of oxygen vacancies. When an external voltage is applied to the oxide layer, new oxygen vacancies are generated in the oxide layer and cause the switching of the device from a high resistive state to a low resistive state.

It is possible to provide a metal oxide based variable resistance device by utilizing the above described resistive switching metal oxide layers. The oxide based variable resistance device may be operated in a unipolar or bipolar manner. In the unipolar manner, the resistive switching process does not dependent on the applied electrical polarity. By changing the amplitude of the applied voltage, the resistance value of the variable resistance material switches between high and low resistive states. In the bipolar manner, the change of the resistance value is controlled by applying voltages of opposite polarities.

The inventor has found that, during operating the oxide variable resistance device with voltage pulses with a smaller amplitude and a narrower width than a normal switching voltage, the resistance value of the oxide variable resistance firstly decreases slightly, then decreases gradually if the voltage pulses are applied sequentially. When the number of the sequential voltage pulses reaches a critical value, the resistance value will decrease abruptly. The device switches to low resistive state.

The above process is similar to the operation of a neuron. The neuron generates a response to any external stimulus. When the stimulus reaches a critical amount, the neuron generates a stimulus response and passes it to a next neuron.

The above process may also be construed as a neuron's computing process. Every application of pulses may be equivalent to an addition operation by 1. The resistance value of the device decreases accordingly. The final resistive state of the device corresponds to the total number of the applied pulses. Therefore, the device may add all the signals together from different inputs and output a signal corresponding to the sum of the addition. In this way, the device may achieve computing function of a neuron.

Based on the above idea, the inventor proposes a new neuron device in which variable resistance material emulates the weighting section and/or the computing section of a neuron.

Voltage pulses can be seen as external stimulus signals. For the variable resistance material, its response to the amplitude and width of the applied voltage pulses may be equivalent to the functionality of the neuron's weighting section, and its response to the number of the applied sequential voltage pulses may be equivalent to the functionality of the neuron's computing section. Accordingly, the resistance value of the variable resistance material represents a comprehensive response to the amplitude, width and number of the voltage pulses, that is, a response of a complete neuron to an external stimulus.

The low resistive state of the neuron device corresponds to the excitation state of a neuron under a stimulus. In this state, the device is highly conductive and can pass the voltage signal to the neighbored neuron devices. In this way, transmission of neuron excitation is processed.

FIG. 1 is a schematic diagram illustrating a structure of the neuron device according to the present invention. The neuron device 10 includes a bottom electrode 11, a top electrode 13, and a layer of variable resistance material 12 sandwiched between the layers 11 and 13. As will be descried below, the neuron device 10 provides the functionalities of a weighting section and an operational amplifier, and an excitation is transmitted from the top electrode 13 to the bottom electrode 11.

The neuron device 10 may be fabricated in the following process:

depositing a layer of metal (e.g., Pt) with a thickness of about 5 to 100 nm on a substrate of silicon wafer by physical vapor deposition (PVD), as the bottom electrode 11;

depositing a layer of metal oxide (e.g., $HfO_2$) with a thickness of about 5 to 30 nm on the bottom electrode 11 by PVD or atomic layer deposition (ALD), as the layer of variable resistance material 12;

implanting dopant elements (e.g., Gd) into the layer of variable resistance material 12 by ion implantation to increase defects (e.g., oxygen vacancies), with a concentration of about 0.1% to 10%, so that the resistive switching process is stable; and depositing a layer of metal or any other conductive material (e.g., TiN) on the layer 12 by PVD.

As an example, the resultant neuron device has a three-layer structure of $Pt/HfO_2/TiN$.

The neuron device 10 may also be formed as other three-layer structures in a process similar to the above. The layer of variable resistance material 12 may be formed of any material selected from a group consisting of $HfO_2$, NiO, $TiO_2$, $ZrO_2$, ZnO, $WO_3$, $Ta_2O_5$, $Al_2O_3$, $MoO_x$, $CeO_x$, $La_2O_3$ and any combination thereof. The top electrode 13 and the bottom electrode 11 may be formed of any suitable conductive material.

Figure 2:
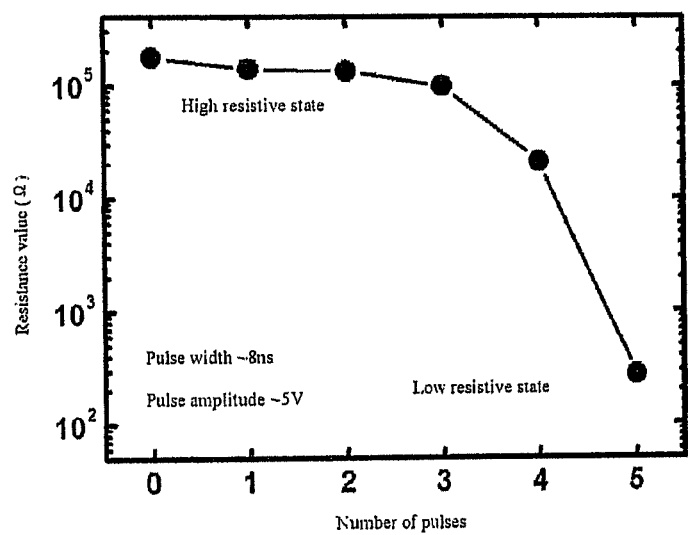
FIG. 2 is a graph showing a number of sequential stimulus pulses versus a resistance value of the neuron device according to the present invention, upon application of stimulus pulses, where the neuron device is switched from a normal state to an excitation state.

FIG. 2 is a graph showing a number of stimulus pulses versus a resistance value of the neuron device according to the present invention, upon application of stimulus pulses, where the neuron device is switched from a high resistive state (i.e., a normal state) to a low resistive state (i.e., an excitation state). The neuron device may have the same structure as shown in FIG. 1. The stimulus pulses are positive pulses. The stimulus pulses typically have an amplitude between about 1V and about 10V and a width between about 1 ns and about 1 μs.

Positive pulses used herein refer to the voltage pulses having a voltage drop always positive in a direction of stimulus transmission (i.e., a voltage drop from the top electrode 13 to the bottom electrode 11 in FIG. 1). Negative pulses refer to the voltage pulses having a voltage drop always positive in a direction of stimulus transmission (i.e., a voltage drop from the top electrode 13 to the bottom electrode 11 in FIG. 1).

It should be noted that the neuron device 10 has no polarity. If the direction of stimulus transmission is reversed, positive pulses will accordingly refer to the voltage pulses having a voltage drop always positive in a direction from the bottom electrode 11 to the top electrode 13, while negative pulses will accordingly refer to the voltage pulses having a voltage drop always positive in a direction from the bottom electrode 11 to the top electrode 13. In this case, similar results can also be obtained.

Figure 3:
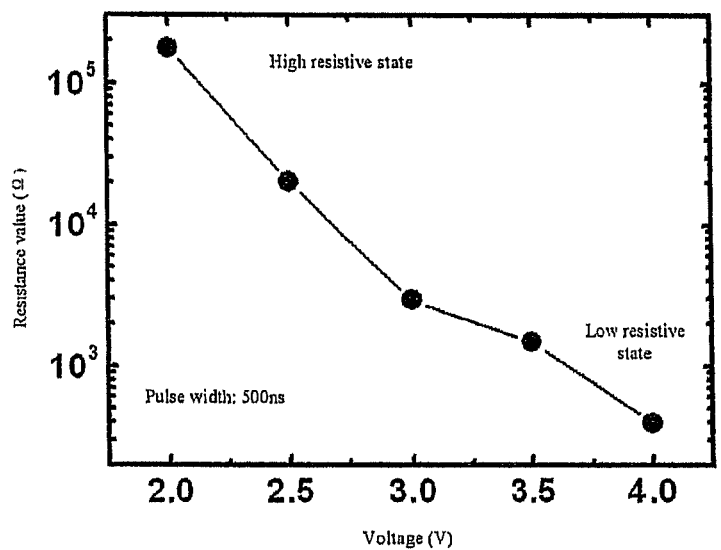
FIG. 3 is a graph showing an amplitude of stimulus pulses versus a resistance value of the neuron device according to the present invention, upon application of stimulus pulses of different amplitudes, where the neuron device is switched from a normal state to an excitation state.
Figure 4:
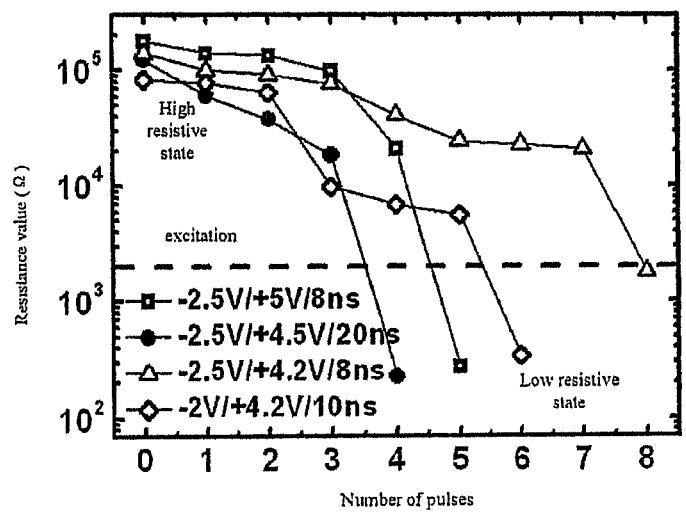
FIG. 4 is a graph showing a number of sequential stimulus pulses versus a resistance value of the neuron device according to the present invention, upon application of stimulus pulses of different amplitudes and widths, where the neuron device is switched from a normal state to an excitation state.
Figure 5:
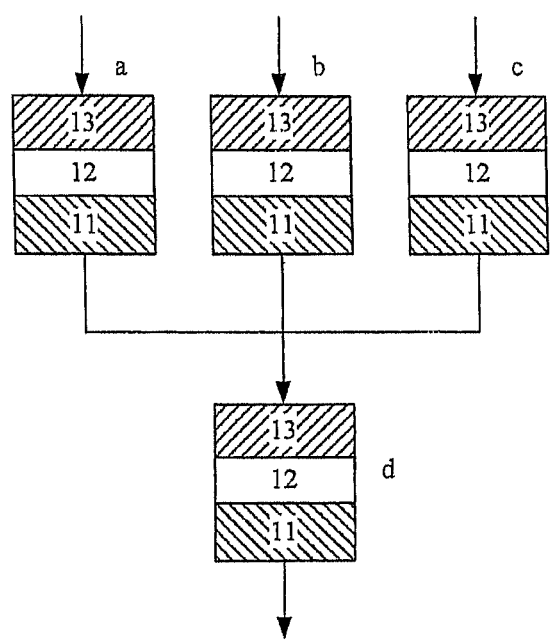
FIG. 5 is a simplified schematic diagram illustrating a neural network including four neurons.

The graphs shown in FIG. 2 and the following FIGS. 3-5 are all obtained by applying square wave pulses. However, it has been found that similar graphs can be obtained by applying voltage pulses of some other wave forms, such as triangle wave pulse, sine wave pulse and so on.

To obtain the graph shown in FIG. 2, reset pulse $V_{reset}$ is first applied to the neuron device 10 to reset the neuron device 10 in a high resistive state (i.e., a normal state). The reset pulses $V_{reset}$ are negative voltage pulses with amplitude larger than threshold voltage $V_{th\_reset}$. For the neuron device 10 in this example, the reset threshold $V_{th\_reset}$ is about 2.2V, and an initial resistance value of the neuron device 10 in the normal state is about $2 \times 10^5 \Omega$.

Stimulus pulses $V_{pulse}$, which are positive voltage pulses with an amplitude larger than the stimulus threshold $V_{th\_set}$, are then applied. The resistance value of the neuron device 10 is measured in a response to the number of the applied pulses. The stimulus threshold $V_{th\_set}$ is greater than the reset threshold $V_{th\_reset}$. For the neuron device 10 in this example, the stimulus threshold $V_{th\_set}$ is about 2.5V.

As shown in FIG. 2, with the stimulus pulses with an amplitude of ~5V and a width of ~8 ns, the resistance value decreases abruptly (compared with the initial high resistive state, the resistance value decreases by about three orders) at the point where about 5 sequential pulses have been applied. Accordingly, the neuron device 10 is in an excitation state. It can be seen that the neuron device responds to the number of sequential pulses such that the number of pulses becomes a source of external stimulus. In this way, the neuron device 10 can process computing function by responding to the number of sequential stimulus pulses.

FIG. 3 is a graph showing an amplitude of stimulus pulses $V_{pulse}$ versus a resistance value of the neuron device according to the present invention, upon application of the stimulus pulses $V_{pulse}$ of different amplitudes, where the neuron device is switched from a high resistive state (i.e., a normal state) to a low resistive state (i.e., an excitation state).

To obtain the graph shown in FIG. 3, reset pulses $V_{reset}$ are first applied to the neuron device 10 to reset the neuron device 10 in a high resistive state (i.e., a normal state). A stimulus pulse $V_{pulse}$ with a pulse width between about 10 ns and about 10 μs, slightly larger than that the stimulus pulses $V_{pulse}$ applied in the example of FIG. 2, is then applied, and the resistance value of the neuron device 10 is measured. The steps of applying the reset pulses $V_{reset}$ and the stimulus pulses $V_{pulse}$ are repeated, while the amplitude of the stimulus pulses $V_{pulse}$ varies, and the resistance value of the neuron device 10 is measured in response to different amplitudes of the stimulus pulses $V_{pulse}$. In this way, the change of the resistance value of the neuron device 10 with the pulse amplitude can be obtained.

The resistance value of the neuron device changes in a response to the amplitude of the applied pulses, as shown in FIG. 3. With positive voltage pulses with a width of ~500 ns, the resistance value decreases abruptly (compared with the initial high resistive state, the resistance value decreases by about two orders) at about 4V. It can be seen that the pulse amplitude can be seen as a variable of external stimulus based on the responding of the device on various pulse amplitudes.

By applying voltages of different amplitudes, the neuron device can be changed to different resistance values. This process corresponds to the cognitive learning process of a neuron. Any information (corresponding to resistive state) of the artificial neuron can be directly learned with stimulus of negative voltage pulses. In this way, the neuron device 10 responds to the amplitude of stimulus pulses, and thus provides the weighting functionality.

FIG. 4 is a graph showing a number of sequential stimulus pulses versus a resistance value of the neuron device according to the present invention, upon application of the sequential stimulus pulses $V_{pulse}$ of different amplitudes and widths, where the neuron device is switched from a high resistive state (i.e., a normal state) to a low resistive state (i.e., an excitation state).

To obtain the graph shown in FIG. 4, reset pulses $V_{reset}$ are first applied to the neuron device 10 to reset the neuron device 10 in a high resistive state (i.e., a normal state). Sequential stimulus pulses $V_{pulse}$ with a specific amplitude and width are then applied, and the resistance value of the neuron device 10 is measured in a response to the number of pulses. After that, the steps of applying the reset pulses $V_{reset}$ and the stimulus pulses $V_{pulse}$ are repeated, during which the amplitude and width of the stimulus pulses $V_{pulse}$ are changed, and the resistance value of the neuron device 10 is measured is response to the number of the pulses under different amplitudes and widths of the sequential stimulus pulses. In this way, it is possible to obtain several graphs showing a resistance value of the neuron device 10 versus a number of pulses when the sequential stimulus pulses $V_{pulse}$ of different amplitudes and widths are applied.

With different amplitudes and widths, different numbers of pulses are required to switch the device from a high resistive state to a low resistive state. In other words, different numbers of pulses are required to generate an excitation. The resistance value of the neuron device 10 is controllable by changing the amplitude and width of the voltage pulses. Accordingly, the neuron device responds to the pulse amplitude such that the number of pulses can become a variable of external stimulus. In this way, the neuron device 10 can have a comprehensive response to the amplitude, width of stimulus pulse and number of the sequential stimulus pulses, and thus provides the functionalities of the weighting and computing sections.

The foregoing embodiments illustrate that the resistive state of the neuron device 10 may be controlled by changing the amplitude and width of the pulses as well as by changing the number of the sequential pulses. Accordingly, the neuron device 10 can provide the functionalities of both the weighting and computing sections of a neuron. The relationship between the resistance value of the device and the amplitude of the applied voltage pulses is exploited for implementing the weighting functionality. As an example, a method similar to that disclosed in U.S. Pat. No. 5,422,982 can be used, in which a voltage signal is inputted at the input, and reduces a resistance value of the variable resistor when the voltage exceeds a certain threshold. The variable resistor in a low resistive state enables the voltage signal to be passed to a next neuron. Further, the relationship between the resistance value and the number of sequential voltage pulses is exploited for implementing the computing functionality.

FIG. 5 shows a schematic diagram of a neutral network including four neuron devices a-d. In the figure, arrows denote a direction of excitation transmission and electrical connections of the four neuron devices.

Stimulus pulses are applied to any one or more of the neuron devices a-c at a previous stage. By weighting pulse amplitude and counting the number of pulses, the respective neuron devices a-c are switched to the excitation state when the amount of the stimulus reaches a critical value. The stimulus pulses can be passed to the neuron device d at a next stage. The neuron device d may respond to a sum of the received stimulus pulses and responds to the stimulus in a similar manner, thereby enabling the excitation transmission.

While the invention has been described with reference to specific embodiments, the description is illustrative of the invention. The description is not to be considered as limiting the invention. Various modifications and applications may occur for those skilled in the art without departing from the true spirit and scope of the invention as defined by the appended claims.

We claim:

1. A neuron device, comprising:
   a bottom electrode,
   a top electrode, and
   a layer of metal oxide variable resistance material sandwiched between the bottom electrode and the top electrode,
   wherein the neuron device is switched to a normal state upon application of a reset voltage pulse,
   wherein the neuron device is switched to an excitation state upon application of a stimulus voltage pulse,
   wherein the neuron device is responsive to different amplitudes and/or different widths of the stimulus voltage pulse of a sequence of stimulus pulses, and provides functionalities of a weighting section and a computing section, and
   wherein the reset voltage pulse is a negative voltage pulse having an amplitude larger than a reset threshold $V_{th\_rest1}$,
   the stimulus voltage pulse is a positive voltage pulse having an amplitude larger than a stimulus threshold $V_{th\_rest1}$,
   the positive voltage pulse has a voltage drop always positive in a direction of stimulus transmission, and
   the negative voltage pulse has a voltage drop always negative in the direction of stimulus transmission.

2. The neuron device of claim 1, wherein the neuron device is also responsive to different numbers of the sequence of stimulus pulses.

3. The neuron device of claim 1, wherein the normal state of the neuron device is a high resistive state, and the excitation state of the neuron device is a low resistive state.

4. The neuron device of claim 1, wherein the layer of variable resistance material is formed of any material selected from a group consisting of $HfO_2$, NiO, $TiO_2$, $ZrO_2$, ZnO, $WO_3$, $Ta_2O_5$, $Al_2O_3$, $MoO_x$, $CeO_x$, $La_2O_3$ and any combination thereof.

5. The neuron device of claim 1, wherein the top electrode and the bottom electrode are formed of either different or identical conductive material.

6. The neuron device of claim 1, wherein the reset voltage pulse is one of square wave, triangular wave and sine wave.

7. The neuron device of claim 1, wherein the stimulus voltage pulse is one of square wave, triangular wave and sine wave.

8. A neural network comprising a plurality of neuron devices,
   wherein each of the plurality of neuron devices comprises:
      a bottom electrode,
      a top electrode, and
      a layer of metal oxide variable resistance material sandwiched between the bottom electrode and the top electrode,
      wherein the neuron device is switched to a normal state upon application of a reset voltage pulse,
      wherein the neuron device is switched to an excitation state upon application of a stimulus voltage pulse,
      wherein the neuron device is responsive to different amplitudes and/or different widths of the stimulus voltage pulse of a sequence of stimulus pulses, and provides functionalities of a weighting section and a computing section,
      wherein the plurality of neuron devices are electrically connected to each other, and
      wherein the reset voltage pulse is a negative voltage pulse having an amplitude larger than a reset threshold $V_{th\_rest1}$,
         the stimulus voltage pulse is a positive voltage pulse having an amplitude larger than a stimulus threshold $V_{th\_rest1}$,
         the positive voltage pulse has a voltage drop always positive in a direction of stimulus transmission, and
         the negative voltage pulse has a voltage drop always negative in the direction of stimulus transmission.

9. The neural network of claim 8, wherein the each of the plurality of neuron devices is also responsive to different numbers of the sequence of stimulus pulses.

10. The neural network of claim 8, wherein the normal state of the each of the plurality of neuron devices is a high resistive state, and the excitation state of the each of the plurality of neuron devices is a low resistive state.

11. The neural network of claim 8, wherein the layer of variable resistance material is formed of any material selected from a group consisting of $HfO_2$, NiO, $TiO_2$, $ZrO_2$, ZnO, $WO_3$, $Ta_2O_5$, $Al_2O_3$, $MoO_x$, $CeO_x$, $La_2O_3$ and any combination thereof.

12. The neural network of claim 8, wherein the top electrode and the bottom electrode are formed of either different or identical conductive material.

13. The neural network of claim 8, wherein the reset voltage pulse is one of square wave, triangular wave and sine wave.

14. The neural network of claim 8, wherein the stimulus voltage pulse is one of square wave, triangular wave and sine wave.

* * * * *

UNITED STATES PATENT AND TRADEMARK OFFICE
CERTIFICATE OF CORRECTION

PATENT NO.         : 8,924,321 B2
APPLICATION NO.    : 13/502462
DATED              : December 30, 2014
INVENTOR(S)        : Jinfeng Kang et al.

It is certified that error appears in the above-identified patent and that said Letters Patent is hereby corrected as shown below:

On the title page, item (54) and in the specification, column 1, the Title "THREE-LAYERED NEURON DEVICES FOR NEURAL NETWORK WITH RESET VOLTAGE PULSE" should read -- NEURON DEVICE AND NEURAL NETWORK --.

Signed and Sealed this
Fifth Day of January, 2016

Michelle K. Lee
*Director of the United States Patent and Trademark Office*